United States Patent [19]

Moore

[11] Patent Number: 5,328,135
[45] Date of Patent: Jul. 12, 1994

[54] SUN VISOR FOR MOTOR VEHICLE

[76] Inventor: Thurman Moore, 1920 Heliotrope Dr., Santa Ana, Calif. 92706

[21] Appl. No.: 934,001

[22] Filed: Aug. 21, 1992

Related U.S. Application Data

[63] Continuation-in-part of Ser. No. 674,894, May 3, 1991, abandoned, which is a continuation-in-part of Ser. No. 475,913, Feb. 6, 1990, Pat. No. 5,040,839.

[51] Int. Cl.$^5$ .................................................. B60J 3/02
[52] U.S. Cl. ..................................... 296/97.4; 296/97.8
[58] Field of Search ................... 296/97.4, 97.5, 97.6, 296/97.8, 141

[56] References Cited

U.S. PATENT DOCUMENTS

| | | | |
|---|---|---|---|
| 2,877,050 | 3/1959 | Isola et al. | 296/97.8 |
| 2,927,819 | 3/1960 | Johnson | 296/97.8 |
| 4,171,845 | 10/1979 | Hirsch | 296/97.4 |
| 5,064,238 | 11/1991 | Mohtasham | 296/97.8 X |
| 5,098,149 | 3/1992 | Lee | 296/97.8 X |
| 5,133,585 | 7/1992 | Hassan | 296/97.8 X |
| 5,135,279 | 8/1992 | Beatty | 296/97.8 X |

FOREIGN PATENT DOCUMENTS

| | | | |
|---|---|---|---|
| 3415904 | 10/1985 | Fed. Rep. of Germany | 296/97.4 |
| 3913562 | 5/1990 | Fed. Rep. of Germany | 296/97.8 |
| 1132147 | 3/1957 | France | 296/97.6 |
| 71696 | 1/1960 | France | 296/97.8 |
| 416518 | 3/1947 | Italy | 296/97.8 |
| 119416 | 5/1989 | Japan | 296/97.8 |
| 288366 | 3/1965 | Netherlands | 296/97.8 |
| 8602322 | 4/1986 | World Int. Prop. O. | 296/97.6 |

Primary Examiner—David M. Mitchell
Assistant Examiner—Gary C. Hoge
Attorney, Agent, or Firm—Plante Strauss Vanderburgh

[57] ABSTRACT

There is disclosed a sun visor and retractable sun screens for a motor vehicle. The sun visor has an expanded width and length and which is foldable for full retraction from the windshield or side window of the vehicle. Preferably the sun visor is used with retractable sun screens which are contained in holders that are mounted above the windows of the vehicle and which have storage recesses for each sun screen in which are mounted roller bars that support the sun screens. The roller bars can be manually operated, or each can have a motor driven actuator to extend or retract the sun screens.

11 Claims, 4 Drawing Sheets

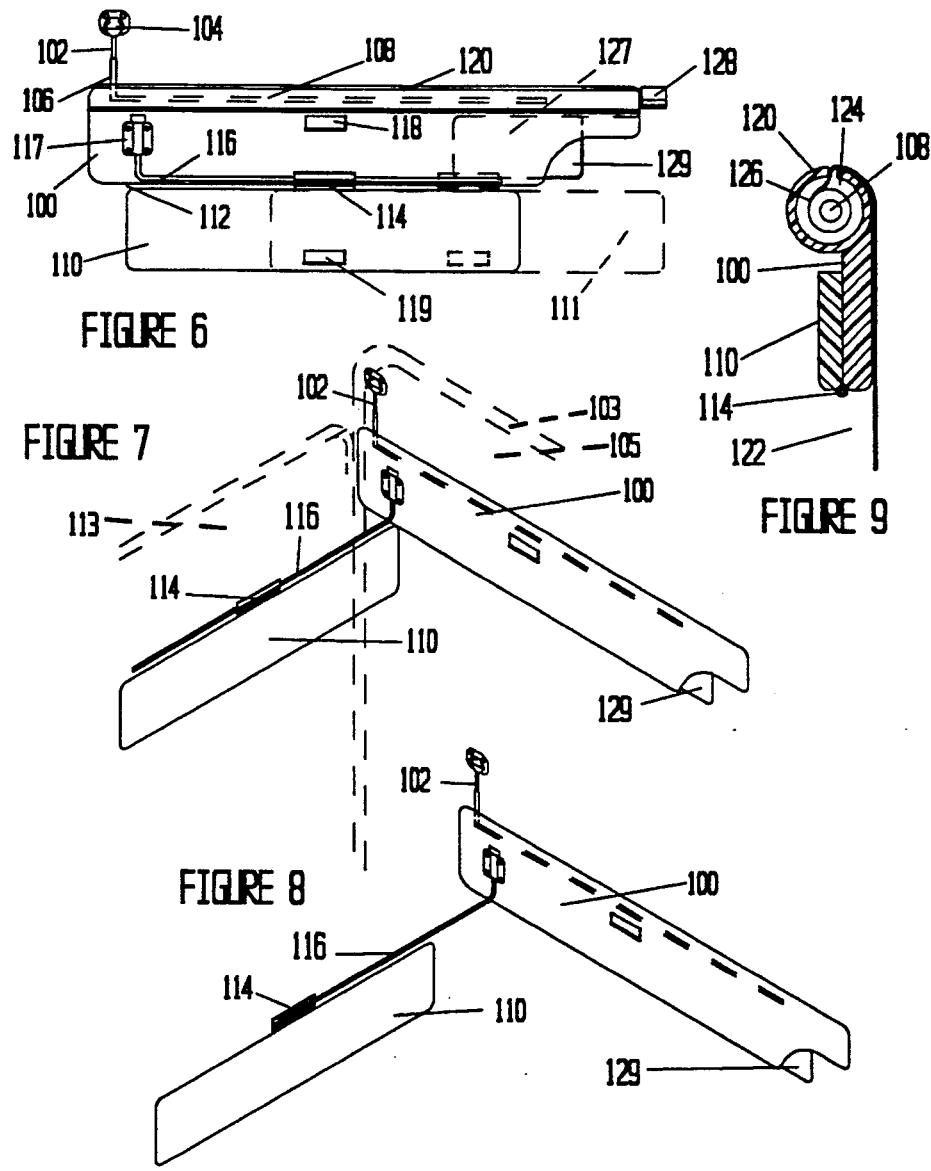

SUN VISOR FOR MOTOR VEHICLE

RELATIONSHIP TO OTHER APPLICATIONS

This application is a continuation in part of my copending application, Ser. No. 674,894, filed May 3, 1991, and abandoned which is a continuation in part of my parent application, Ser. No. 475,913 filed Feb. 6, 1990, now U.S. Pat. No. 5,040,839.

BACKGROUND OF THE INVENTION

1. Field of Invention

This invention relates to sun screen for a motor vehicle and in particular, to an improved sun screen and holder, and sun visor, for a vehicle.

2. Brief Statement of the Prior Art

Motor vehicles parked in full sunlight experience a very pronounced rise in interior temperature, and this problem is accentuated by the use of expansive glass areas such as wide windshields, sunroofs and the like. Various attempts have been used to provide reflective surfaces that reflect the sun's rays and eliminate or substantially reduce this "greenhouse" effect. The most popular of these approaches has been an inexpensive foldable sun screen which is typically formed of cardboard and the like and which is unfolded and placed inside the vehicle adjacent the windshield. While these sunscreens are very popular and relatively inexpensive, they have a number of shortcomings. They are cumbersome and considerable effort is required to unfold the screens and place them beneath the windshield. The sunscreens are also bulky and difficult to store when not in use. Additionally, the screens are not readily usable for the rear and side windows of the vehicle.

Sun visors which are commonly provided in vehicles have flat, single sheet shapes and are rotatable mounted to the inside roof or upper trim above the windshield, so they can be pivoted to position the visor along the windshield or along a side window. These visors have insufficient span and do not adequately shield the driver or passenger from the sun's rays.

OBJECTIVES OF THE INVENTION

It is an object of this invention to provide a sun screen and screen holder for the rear and/or side windows of a motor vehicle.

It is an additional object of this invention to provide sun screens which readily retract into and extend from holders.

It is a further object of this invention to provide an assembly of a retractable sunscreen and holder which can be used for any of the side and rear windows of a motor vehicle and which fits compactly against the headliner of the vehicle.

It is also an object of this invention to provide holders for retractable sunscreens for a vehicle which have storage compartments for the sunscreens.

It is a further object of this invention to provide a sun visor for a vehicle which provides substantially complete protection to passengers and the driver of the vehicle.

BRIEF DESCRIPTION OF THE INVENTION

This invention comprises a retractable sun screen for a motor vehicle. The sun screen can be provided for any or all of the side and rear windows of the vehicle and is preferably used in combination with a sun visor of expanded width and length which is foldable for full retraction from the windshield or side window.

The retractable sunscreens are used in an assembly with holders which have internal compartments for the retracted sunscreens, and which can be readily attached onto the head liner of the vehicle, directly above the windows. The screens are stored in the holders on rollers which preferably have operator wheels or knobs for manual raising and lowering of the sunscreens.

If desired, the operator for the sun screens can include a motor driven actuator to extend or retract the sun screens. An electrical motor can be provided to retract and extend the sun screens and the electrical motor is connected through a switch in the passenger compartment to the vehicle's electrical system.

The sun screens are formed of thin film plastics, preferably of Mylar ® having a thickness from 1 to about 10 mils, preferably from 2 to about 5 mils, which are mounted on rollers that are rotationally supported within compartments of the holders.

Preferably a sun screen is provided immediately adjacent each of the rear and side windows so that each of these windows can be protected with a retractable sun screen.

BRIEF DESCRIPTION OF THE FIGURES

The invention will be described with reference to the figures of which:

FIG. 6 is a view of an unfolded sun visor used in combination with the sunscreens and holders of the invention;

FIGS. 7 and 8 illustrate the extendable positions of the components of the sun visor of the invention;

FIG. 9 illustrates a visor having a retractable sun screen.

DESCRIPTION OF PREFERRED EMBODIMENTS

Figure 1:
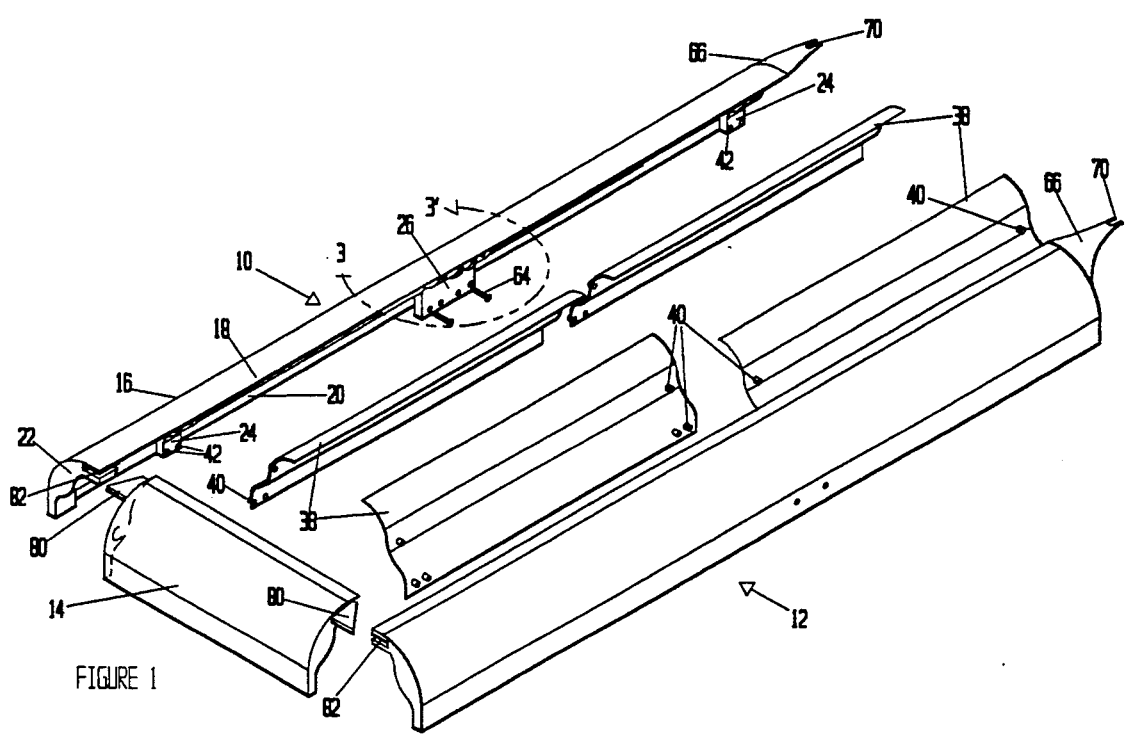
FIG. 1 is an exploded, perspective view of the holders for the sunscreens used in a complete embodiment of the invention.

Referring now to FIG. 1, there is illustrated an exploded perspective view of the sun screen holders for a complete installation in a motor vehicle. The holders include left and right side holders 10 and 12, and a rear holder 14. Each of the holders are intended to be installed on opposite interior sides and the rear of the passenger compartment of a motor vehicle, adjacent the inside roof line of the passenger compartment.

Each holder is formed of a first frame member 16 in the shape of a longitudinal angle plate with a horizontal flange 18, a vertical flange 20 and an arcuately convex corner 22. The arcuate configuration of the angle plate corner 22 fits the contour of the interior upper roof line of the passenger compartments of most cars so that when installed, the vertical flange 20 seats against the interior car wall 21, and the horizontal flange 18 bears against the underside of the headliner 19 of the car. It is apparent, or course, that the physical dimensions and contour of the frame can be varied, as necessary to fit against the interior surfaces of various cars.

Figure 2:
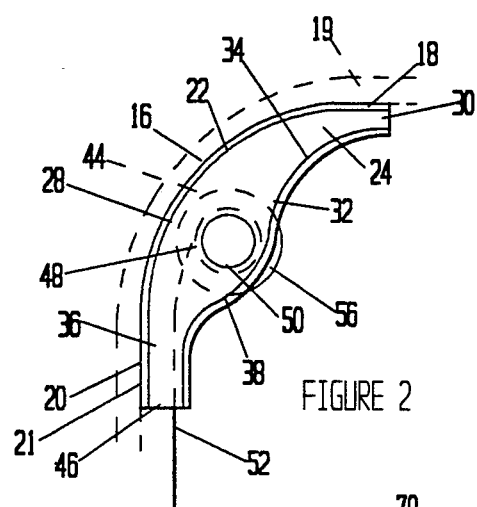
FIG. 2 is an enlarged end view of a holder with the sunscreen deployed in an extended position.

A plurality of end plates 24 are spaced along each frame member 16, and a center section 26 is located at the center of each of the side holders 10 and 12. As best shown in FIGURE 2, the end plates 24 have an outer surface 28 with a contour mating with the frame member 16, and have a very narrow upper edge 30. The end plates 24 have a smoothly contoured inside surface 32 with a reverse bend 34 and a base 36 with generally parallel sides.

Each of the holders 10, 12 and 14 also includes a cover plate 38 (see also FIG. 1) which has a contour mating the inside surface of the end plates, to which it is attached by a plurality of plugs 40 which extend from its surface and which are received within recesses 42 in the end plates 24. Once assembled, each holder forms an enclosure having an internal compartment 44 which is open along a longitudinal bottom slot 46 coextensive the length of each compartment 44. At their forward ends, the frames include a bracket 66 having a yoke 70 which attaches to the sun visor posts of the vehicle, all described in greater detail with reference to FIG. 4.

Referring now to FIG. 2, a roller bar 48 is rotationally received in each compartment, and the bar of the roller extends the entire length of its compartment 44. For this purpose, the end plates have an aperture 50 which receives an end of the roller bar. If desired, suitable bearings, e.g., an oil impregnated bronze bushing, or roller bearings can also be mounted in the end plate apertures 50, supporting the opposite ends of each roller bare In the center section 26, the end plates 24 form an interior compartment to receive hand wheels 56, all described in greater detail with reference to FIG. 3.

A sunscreen 52 of thin film plastic is attached to each roller, and rolled onto the roller. The sun screens can be formed of a suitable thin film plastic, such as polyethylene, polypropylene, polyvinyl chloride, etc. Preferably the sunscreens are formed of Mylar ® a polyester film film, having a thickness from about 1 to about 5 mils. The sun screens preferably are provided with highly reflective surfaces, e.g., colors or opaque additives can be incorporated in the plastic, or the surfaces of the plastic film can be metallized to provide maximum heat and radiation reflective properties.

Figure 3:
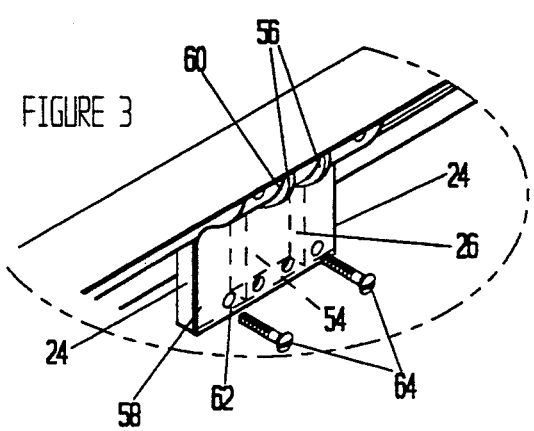
FIG. 3 is an enlarged view of the area within the circled area 3—3' of FIG. 1.

As shown in FIG. 3, the frame of each holder includes a center section 26 which is formed by a pair of spaced-apart end plates 24 which form a center compartment 54. The ends of the roller bars 48 of adjacent rollers extend into the center compartment 54, and hand wheels 56 are fixedly secured to the ends of each roller bare The hand wheels 56 are of sufficient diameter to extend beyond the center plates, and a center cover 58 can be placed over the center compartment. The center cover has the same shape or contour as the cover plates 38, and has a pair of adjacent slots 60 through which the hand wheels 56 extend, permitting a user to manually rotate the roller bars 48, raising and lowering the sunscreens.

Preferably, the center section extends downwardly beyond the lower edge of the holders 10 and 12 and has one or more through apertures 62 which can receive a fastener such as a machine screw 64 which can be driven into the structural post of the vehicle which is located between the front and rear doors.

Figure 4:
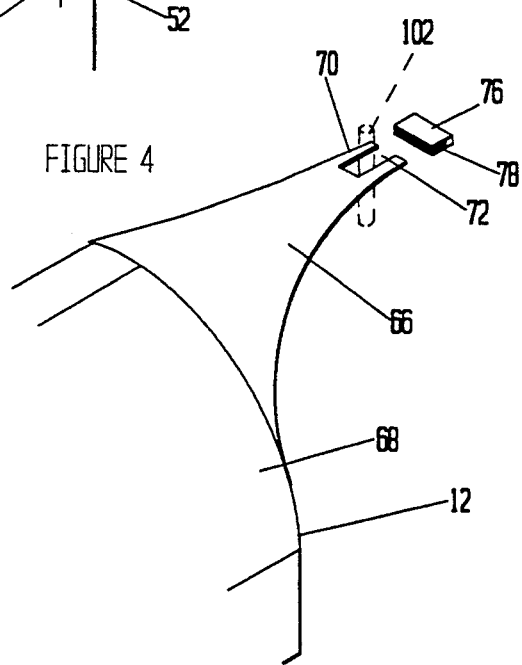
FIG. 4 is a view of the attachment bracket at the front of the sunscreen holder.

At their forward ends, the frames are supported on the sun visor posts of the vehicle. FIG. 4 illustrates a bracket 66 which is useful for this purpose. The bracket 66 extends from the forward end 68 of each of the side frames 10 and 12, and tapers into a yoke 70 having an end slot 72 which slips over the sun visor post 74, shown in phantom lines. If desired, the end slot 72 can be closed with a key plate 76 which has a longitudinal slot 78 that fits over the end of the yoke 70 to prevent release of the frame 12 from the post 74.

The complete assembly of sunscreens and holders for a vehicle also includes a rear screen and holder 14. The rear holder 14 is of the same construction as the side holders 10 and 12 with a rear frame and a rear cover (not shown) of the same shapes as used for the side holders. The opposite ends of the rear holder have a tapered wedge 80 which is received in a tapered slot 82 carried at the rear end of each side holder 10 and 12. The taper of the wedge 80 and slots 82 is at a slight angle to the longitudinal sides of the side holders, and generally transverse to the longitudinal sides of the rear holder. This provides a wedge action which expands the side holders 10 and 12, as the wedges 80 are forced into their respective slots 82. The expansion of the side holders 10 and 12 exerts a compressive force against the interior sides of the vehicle, to secure the holders in the vehicle. Alternatively, one or more screw fasteners such as machine screws 64, shown with the center section 26, could also be used to secure the rear holder 14, or the rear ends of the side holders 10 and 12 to a structural member of the vehicle.

Figure 5:
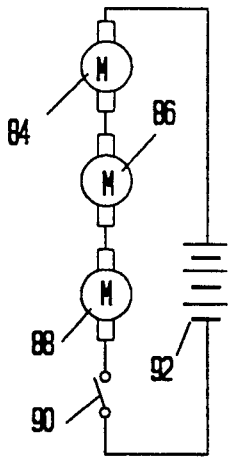
FIG. 5 is an electrical schematic of the car battery and electrical motors.

If desired, the center compartment can receive a small electrical motor with the shaft of the motor mechanically geared to its respective roller bar. As shown in FIG. 5, the electrical motors 84, 86 and 88 can be electrically connected to the vehicle's electrical system thorough a switch 90 located in the driver's compartment, for remote actuation of the sun screens. In a complete system, five separate electrical motors can be provided, one for each of the front and rear side, and rear window screens. As shown in FIG. 5, the drive motors are in circuit through switch 90 to the electrical system of the car which includes the car battery 92. The switch 90 can be located in the passenger compartment of the motor vehicle.

Figure 10:
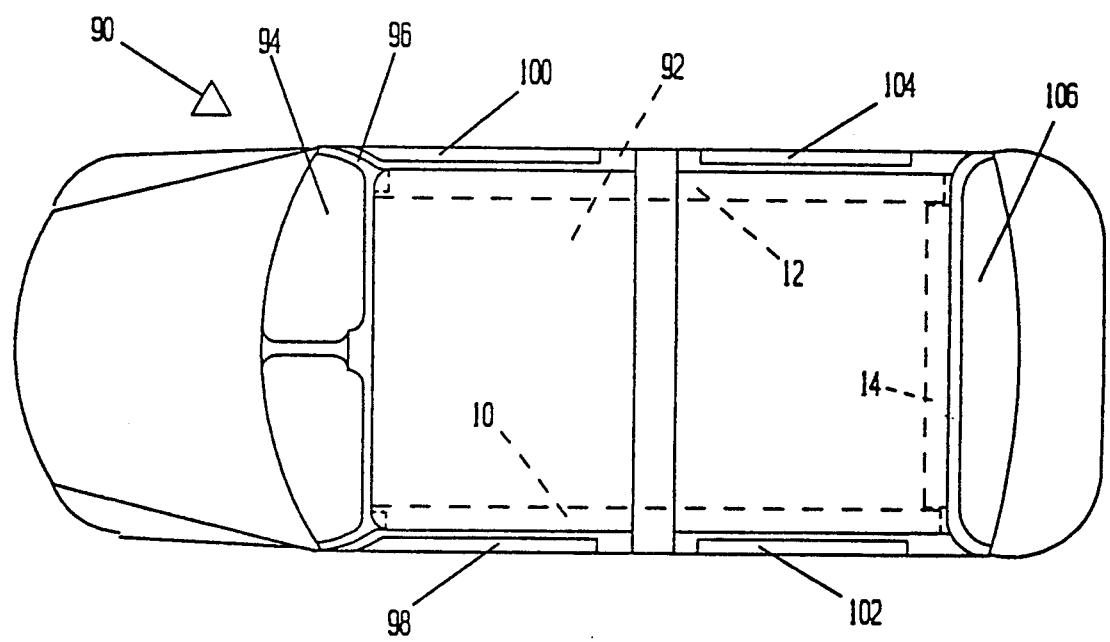
FIG. 10 illustrates the position of the screens and holder of this invention in a vehicle.

Referring now to FIG. 10, there is illustrated a plan view of the top of a vehicle 90 fitted with the screens and holders 10, 12 and 14 shown in FIGS. 1-4. The vehicle has a passenger compartment 92, with a windshield 94 surrounded by a frame 96, a left front side window 98, a right front side window 100, a left rear side window 102, a right rear side window 104 and a rear window 106. As described with regard to FIGS. 1-4, the holders 10, 12 and 14 of the invention are received within the passenger compartment 92 of the vehicle against the interior side walls, and headliner of the vehicle; see FIG. 2.

As previously mentioned, the invention also includes a sun visor 100, which is shown in FIG. 6. The sun visor 100 is mounted to the vehicle with a support post 102 that is pivotally secured to the inside frame 103 surrounding the windshield 105 of the vehicle with a pivotal joint such as a ball and socket joint 104. Support post 102 has a telescoping section to permit it's extension for a distance of from 1 to 3 inches. The visor 100 has a right angle arm 106 with a longitudinal section 108 that is received within the visor to provide a rotatable support for the visor, as in a conventional visor. The visor of this invention, however, has a plurality of foldable panels including a lowermost panel 110 which is secured to a bottom edge 112 of the visor 100 with a sleeve 114 that is slidably received over a longitudinal arm 116 that extends along the bottom edge of the visor 100. The visor 100 can also have a retractable end panel 129 which slides into a slot 127 formed in the end edge of the visor panel 100.

As shown in FIG. 6, the lowermost panel can be swung down to its illustrated position. It also can be extended to either side, bracket 114 sliding along arm 116, e.g., to the extended position 111 which is shown in phantom lines. When the lowermost panel is folded into its retracted position, it can be secured by suitable attachment means, e.g., Velcro ® tabs 118 and 119, which are placed on opposing surfaces of the main visor panel 100 and the lowermost panel 110.

The arm 116 is pivotally secured to the visor panel 100, preferably by a sleeve bracket which permits the entire assembly of the central and lower panels to be rotated 90 degrees, to the position shown in FIG. 7 where it is beside the front side window 113 of the vehicle. FIGS. 7 and 11 are intended only to illustrate various positions of the panel 110, and do not show the thicknesses of the visor 100 and lower panel 110.

The panel 110 can also be extended into the position shown in FIG. 8, where it has been slid to its maximum extension with sleeve bracket 114 against a stop on the end of arm 116 thus permitting its sliding extension along the front side window 113. Referring now to FIG. 9, there is illustrated a sectional view through the visor 100, with the lower panel 110 folded into its retracted position. The visor 100 has an upper hollow cylindrical edge 120 with a central longitudinal cavity 124. A roller 126 is rotationally supported in the cavity 124, coaxial with arm 108, and a sun screen 122 is secured to the roller. The sun screen extends out of the cylindrical edge through a slot which is opposite from the visor panel 100. As the roller is rotated, it extends or retracts the sun screen 122. The roller can have an actuator knob 128 mounted on the end of the visor, as shown in FIG. 6.

The invention has been described with reference to the illustrated and presently preferred embodiment. It is not intended that the invention be unduly limited by this disclosure of the presently preferred embodiment. Instead, it their obvious equivalents, set forth in the following claims.

What is claimed is:

1. The combination of sun screens and holders therefor and a sun visor, for use in a motor vehicle having a forward facing windshield surrounded by a frame and having a sun visor post attached thereto, and a passenger compartment including side and rear windows which includes:
   a. at least one sun screen holder for mounting within the passenger compartment along the roof line thereof, immediately above a selected one of said side and rear windows,
   b. a window sun screen of flexible, thin film plastic having a thickness from 1 to 5 mils of sufficient width and length dimensions to span said selected window;
   c. a roller bar rotationally supported within said holder and extending coextensively with the span of said selected window, with said sun screen rolled thereon, and including hand wheel means fixedly secured to said roller bar for manual lowering and raising of said sun screen between a window covering position and a withdrawn position;
   d. bracket means projecting from a forward end of said holder including a slot to receive said sun visor post, and means along the length of said holder for attachment to said vehicle; and
   e. a sun visor supported by a first pivotal support post adapted to be permanently secured to the inside upper edge frame surrounding a windshield of a motor vehicle having a side window, said first pivotal support post having an orthogonal arm, said sun visor including a first flat, elongated panel to extend to approximately the midpoint of said windshield pivotally secured about said orthogonal arm of said first pivotal support post, a second pivotal support post secured to said first panel beneath and adjacent to said first pivotal support post and having a panel orthogonal arm which extends coextensively along the bottom edge of said first panel, and a second flat elongated panel pivotally secured about said panel orthogonal arm of said second pivotal support post by a tubular sleeve secured along the upper edge of said second panel, with said sleeve being slidably received over the orthogonal arm of said second pivotal support post, thereby permitting the sliding extension of said second panel from said second pivotal support post, whereby said second panel can be unfolded to a position extending beneath and along the bottom edge of said first panel, or can be pivoted to a second position at a right angle to said first panel and can be slidably extended in either position, whereby said second panel may be placed beside, and slidably extended along, the side window of said car while said first panel remains beside the windshield of said motor vehicle.

2. The combination of the sun visor and sun screens and holders therefor of claim 1 wherein said screen is formed of polyester film.

3. The combination of the sun visor and sun screens and holders therefor of claim 1 including motor means operatively connected to said roller means.

4. The combination of the sun visor and sun screens and holders therefor of claim 3 wherein said motor means is electrically powered.

5. The combination of the sun visor and sun sensors and holders therefor of claim 4 wherein said motor vehicle has an electrical system, including electrical storage battery and wherein said motor means is in circuit to said electrical system through switch means within said passenger compartment.

6. The combination of the sun visor and sun sensors and holders therefor of claim 5 wherein said vehicle has rear window, right and left side front windows and right and left side rear windows and wherein a plurality of sun screens are provided, one each at the rear, left front, left rear and right front and right rear windows of said vehicle, each sun screen being of sufficient dimensions to span its respective window and located in said passenger compartment to cover its respective window, and including right and left side, and rear sun screen holders, each holder including roller means, one each located above the rear, right front, right rear, and left front and left rear windows, with each of said sun screens rolled onto its respective roller means to permit said screens to be raised and lowered independently of movement of each other whereby said rollers are effective to move said screens between their retracted and window covering positions.

7. The combination of the sun visor and sun screens and holders therefor of claim 6 wherein said sun screens are formed of polyester film.

8. The combination of the sun visor and sun screens and holders therefor of claim 6 including a plurality of electrically powered motor means, one each operatively connected to each of said roller means.

9. The combination of the sun screens and holders of claim 1 for use with a vehicle which has rear, right and left side front and right and left side rear windows located at the rear, and along the right and left sides, respectively of said vehicle and wherein a plurality of sun screens are provided, one each at the rear, left front, left rear and right front and right rear windows of said vehicle, each sun screen being of sufficient dimensions to span its respective window and located in said passenger compartment to cover its respective window, and including right and left side sun screen holders and rear sun screen holders.

10. The combination of the sun screens and holders of claim 9 wherein the opposite ends of said rear sun screen holder are supported from the rear ends of said side sun screen holders and including wedge shaped tongues extending from opposite ends of said rear sun screen holder and received in wedge shaped slots at the rear ends of each of said side sun screen holders, said wedge shaped tongues and slots exerting an outwardly compressive force on said side sun screen holders.

11. The combination of sun screens and holders for installation in a motor vehicle having a passenger compartment with an interior upper roof line and a headliner and including side and rear windows, and a front windshield surrounded by a frame with a first pivotal support post secured thereto, which combination includes:

a. at least one sun screen holder therefor for mounting within the passenger compartment along the roof line thereof, immediately above a selected one of said side and rear windows, said side holder comprising a first elongated angle member having a horizontal flange, an spaced apart end plates and a cover member supported by and spanning between said end plates to form an enclosed compartment open along its bottom edge such that when installed in said motor vehicle, the angle member fits the contour of the interior upper roof line of said motor vehicle with its horizontal flange bearing against the underside of the headliner of said vehicle;

b a window sun screen of flexible thin film plastic having a thickness from 1 to about 5 mils of sufficient width and length dimensions to span said selected window and movable between a windshield covering position and a withdrawn position;

c. a roller bar rotationally supported within said enclosed compartment of said holder and extending coextensively with the span of said selected window, with said sun screen rolled thereon, and including hand wheel means fixedly secured to said roller bar for manual lowering and raising of said sun screen; and including front support brackets projecting from the front of each said side holder and including a slot in each of said brackets to be received about said first pivotal support post.

* * * * *